(12) United States Patent
Foiret

(10) Patent No.: US 11,320,801 B2
(45) Date of Patent: May 3, 2022

(54) METHOD FOR CONTROLLING AN ACTUATOR AND ASSOCIATED CONTROL BY CHANGING TO OPEN LOOP CONTROL WHEN REDUNDANT SENSORS ARE NOT IN AGREEMENT

(71) Applicant: SAFRAN AIRCRAFT ENGINES, Paris (FR)

(72) Inventor: Guilhem Alcide Auguste Foiret, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 842 days.

(21) Appl. No.: 16/300,173

(22) PCT Filed: May 10, 2017

(86) PCT No.: PCT/FR2017/051120
§ 371 (c)(1),
(2) Date: Nov. 9, 2018

(87) PCT Pub. No.: WO2017/194881
PCT Pub. Date: Nov. 16, 2017

(65) Prior Publication Data
US 2019/0171182 A1 Jun. 6, 2019

(30) Foreign Application Priority Data

May 10, 2016 (FR) ...................... 1654142

(51) Int. Cl.
*G05B 19/4062* (2006.01)
*G05B 23/02* (2006.01)

(52) U.S. Cl.
CPC ..... *G05B 19/4062* (2013.01); *G05B 23/0221* (2013.01); *G05B 2219/14126* (2013.01); *G05B 2219/34013* (2013.01)

(58) Field of Classification Search
CPC ............ G05B 19/4062; G05B 23/0221; G05B 2219/14126; G05B 2219/34013; G05B 11/16
See application file for complete search history.

(56) References Cited

U.S. PATENT DOCUMENTS 4,248,196 A * 2/1981 Toelle ................. F02D 41/1491
123/680
4,524,313 A 6/1985 Kuno et al.
(Continued)

OTHER PUBLICATIONS

International Search Report of PCT/FR2017/051120 dated Aug. 29, 2017.
(Continued)

*Primary Examiner* — Kenneth M Lo
*Assistant Examiner* — Jonathan Michael Skrzycki
(74) *Attorney, Agent, or Firm* — Sughrue Mion, PLLC

(57) ABSTRACT

The present invention relates to a method for controlling an actuator (4) comprising a mobile element (60), the method comprising steps of receiving a set-point signal and two position-measurement signals (A, B) of the mobile element (60) acquired by different position sensors (7), calculating a deviation between the two position-measurement signals (A, B), generating (102) a control signal (S) for controlling a movement of the mobile element (60) on the basis of the set-point signal (E) and at least one of the position-measurement signals (A, B), the method being characterised in that when the deviation between the position-measurement signals (A, B) crosses (201) a predetermined threshold, said method comprises the following steps: setting (202) the control signal (S) to a constant value so as to immobilise the mobile element (60), for each of the two measurement signals (A, B), calculating an interval of positions associated with the measurement signal (A), and detecting an output of
(Continued)

the value of a measurement signal (A) outside the associated interval while the control signal (S) is set to the constant value.

9 Claims, 4 Drawing Sheets

(56) References Cited

U.S. PATENT DOCUMENTS

| | | | | | |
|---|---|---|---|---|---|
| 4,671,243 | A | * | 6/1987 | Deutsch | F02D 41/1495 |
| | | | | | 123/688 |
| 5,233,542 | A | * | 8/1993 | Hohner | G05B 9/03 |
| | | | | | 700/79 |
| 7,312,595 | B2 | * | 12/2007 | Kamio | G05B 19/4062 |
| | | | | | 318/701 |
| 8,844,501 | B2 | * | 9/2014 | Dolker | F02D 41/3845 |
| | | | | | 123/458 |
| 2006/0109538 | A1 | * | 5/2006 | Mushika | G09G 3/3466 |
| | | | | | 359/291 |

OTHER PUBLICATIONS

International Search Report, dated Aug. 29, 2017 from the International Bureau in counterpart International application No. PCT/FR2017/051120.
Preliminary Report, dated Feb. 6, 2017 from the International Bureau in counterpart International application No. 1654142.

* cited by examiner

METHOD FOR CONTROLLING AN ACTUATOR AND ASSOCIATED CONTROL BY CHANGING TO OPEN LOOP CONTROL WHEN REDUNDANT SENSORS ARE NOT IN AGREEMENT

FIELD OF THE INVENTION

The present invention relates to a method for controlling an actuator comprising a movable element, and a control device configured to implement a method of this kind.

PRIOR ART

To control the displacement of a movable actuator element, it is well known to implement an actuation system operating in a closed loop. To this end, an actuator control device generates an actuator control signal based on a set-point signal and a return signal provided by a sensor measuring the position of the movable element of the actuator.

It is also known to double the position sensor of the actuator. The two sensors provide two position measurement signals A and B.

For example, document U.S. Pat. No. 4,524,313 describes an engine control system in which two engine angular position measurement signals A and B are retrieved. When the deviation between the two signals A and B exceeds a predetermined threshold, the engine is brought to an emergency stop. However, when one of the sensors used suffers a failure, this system is not capable of determining which of the two sensors has failed.

Furthermore, theoretically, such redundancy of sensors allows continued correct regulation of the actuator in the case where one of the sensors breaks down.

As long as the deviation between the two signals remains lower than a predetermined threshold, the control signal depends on both signals A and B. When the deviation between the two signals exceeds a predetermined threshold, the actuation system selects one of the two measurement signals A, B. The control signal is generated by the control device using only the selected signal.

It is known to select, among the measurement signals A and B, the one having the maximum (or minimum) value, when the deviation reaches the predetermined threshold. For certain systems, the extreme value selected (maximum or minimum depending on the system considered) is a so-called safety value, i.e. a value which minimizes or prevents certain undesired edge effects.

A disadvantage of this type of solution is that it does not allow a failure of the safety signal to be compensated. In the case of such a failure, the local servo loop attempts to regulate the position of the actuator, on the basis of the safety signal, which is erroneous and noisy. Consequently, the real position of the actuator moves away from a set-point signal and undergoes rapid variations, which accelerates the wear of the actuator. In the particular context of an actuator for a turbomachine engine, the performance of the engine can be degraded by it and the fuel consumption of the engine increase unduly. In certain breakdown cases, the deviation is accompanied by strong noise in the measurement, a consequence of a poor electrical connection. In a system where the actuator a VSV (variable stator vane) type valve, the selection of the faulty measurement channel will cause real oscillations of the VSV valve (the local loop tries to regulate to a position feedback which is very noisy), which can cause undesired operational events.

Another disadvantage of this solution is that no diagnostic of the failure encountered is really carried out. It is then necessary to call a maintenance team on the ground to carry out the diagnostic, which is potentially long and costly.

DISCLOSURE OF THE INVENTION

One goal of the invention is to detect automatically and rapidly a deviation of a position sensor in a closed loop actuation system using several position sensors.

Another goal of the invention is to compensate for such a deviation without human intervention.

A control method of an actuator comprising a movable element is thus proposed, the method comprising the steps of:
  receiving a set-point signal and two position measurement signals of the movable element acquired by the different position sensors;
  calculating a deviation between the two position measurement signals;
  generating a control signal to control a displacement of the movable element from the set-point signal and from at least one of the position measurement signals;
  wherein, when the deviation between the position measurement signals exceeds a predetermined threshold, said method includes the following steps:
    setting the control signal in open loop at a constant value selected independently of the position measurement signals (A, B) so as to immobilize the movable element;
    for each of the two measurement signals, calculating a position interval associated with the measurement signal, in which at least one of the position intervals has a length greater than the resolution of the position sensor (7) having acquired the measurement signal associated with the interval;
    detecting a departure of the value of a measurement signal outside the associated interval while the control signal is fixed at the constant value.

Thanks to setting the control signal in open loop, the actuator immobilizes its movable element. When the movable element is immobile, a measurement signal supplied by a sensor operating correctly indicates a constant position of the movable element of the actuator, while a signal supplied by a faulty sensor can continue to vary. The departure of the value of one of the measurement signals outside the interval associated with it signifies that this signal is undergoing such a variation, which therefore makes it possible to detect that this signal is flawed with a deviation. Thus, the definition of a position interval for each of the measurement signals allows the detection of a deviation in any one of the position measurement signals.

Moreover, the setting of the open loop control signal at a constant value holds the actuator immobile, which makes it possible to avoid premature wear of this actuator after detecting the crossing of the predetermined threshold.

The control method proposed here further has the advantage of allowing simple breakdown detection: on the one hand, complementary measurements other than those supplied by the position sensors are not necessary for diagnosing a deviation of one of the position sensors; on the other hand, no thermodynamic model of the actuator, costly in terms of calculation load and less accurate, is necessary for such a diagnosis.

The control method according to the invention can be completed using the following optional features taken alone or in combination when that is technically possible.

the control signal is fixed at a constant value selected independently of the position measurement signals;

after the step of detecting a departure, the control signal is generated from the set-point signal and from at least one measurement signal, excepting the measurement signal the departure of which outside the associated interval has been detected;

the control signal is generated from the set-point signal and from at least one measurement signal after a predetermined period starting from the instant in which the deviation between the measurement signals exceeded the predetermined threshold, the period preferably being less than 100 milliseconds;

the method comprises reporting a fault of the measurement signal the value of which has departed outside the associated interval.

the position interval includes the value taken by the measurement signal when the deviation exceeded the predetermined threshold;

at least one of the position intervals has a length greater than or equal to six times said resolution;

the control signal is generated from an average of each position measurement signal the departure of which outside the associated interval has not been detected.

Also proposed, according to a second aspect of the invention, is a control device for an actuator comprising a movable element, the control device comprising:

at least one input for receiving a set-point signal and two position measurement signals of the movable element acquired by different position sensors;

a corrective network configured to calculate a deviation between the two position measurement signals, and to generate a control signal for controlling a displacement of the movable element from the set-point signal and from at least one of the position measurement signals;

wherein the corrective network is further configured to implement the following steps, when the deviation between the measurement signals exceeds a predetermined threshold:

setting the control signal in open loop to a constant value selected independently of the position measurement signals (A, B) so as to immobilize the movable element;

for each of the two measurement signals, calculating a position interval associated with the measurement signal, in which at least one of the position intervals has a length greater than the resolution of the position sensor (7) having acquired the measurement signal (A) associated with the interval;

detecting a departure of the value of a measurement signal outside the associated interval, while the control signal is fixed at a constant value.

Also proposed, according to a third aspect of the invention, is a control system for an actuator comprising a movable element, the system comprising:

an actuator control device according to the second aspect of the invention, a plurality of position sensors configured to acquire position measurement signals of the movable element;

at least one feedback channel to transmit to the input of the control device the measurement signals acquired by the position sensors.

DESCRIPTION OF THE FIGURES

Other features, aims and advantages of the invention will be revealed by the description that follows, which is purely illustrative and not limiting, and which must be read with reference to the appended drawings in which.

In all the figures, similar elements bear identical reference labels.

DETAILED DESCRIPTION OF THE INVENTION

Figure 1:
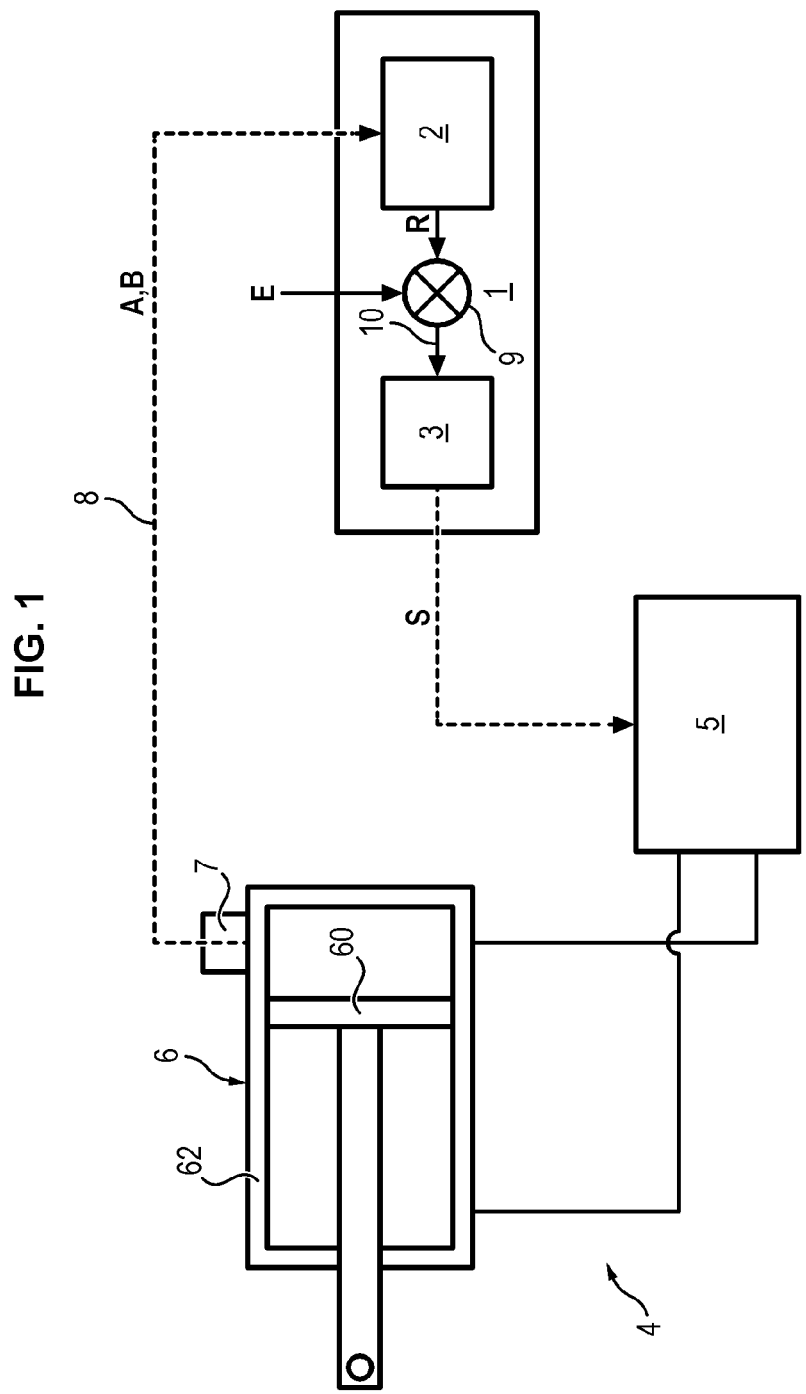
FIG. 1 is a schematic representation of an actuation system according to one embodiment of the invention.

With reference to FIG. 1, an actuation system comprises a control device 1.

The control device 1 comprises at least one input configured to received different signals: a set-point signal E and a plurality of measurement signals A, B which are detailed hereafter.

Furthermore, the control device 1 comprises a control module 2 configured to generate a feedback signal R based on at least one of the measurement signals A, B.

The control device includes a comparator 9 charged with evaluating the difference between the set-point signal E and the feedback signal R generated by the control module 2. The signal generated by the comparator 9 is hereafter designated the error signal 10.

The control device 1 further comprises a corrective network 3 configured to generate a control signal S from the set-point signal E and/or the difference between the set-point signal E and the feedback signal R evaluated by the comparator 9, or the error signal 10.

The control module 2, the corrective network 3 and the comparator 9 can be distinct physical components within the control device 1. Each of these components comprises at least one processor configured to execute a specific program.

As a variant, the control module 2 and the corrective network 3 or virtual modules of the same program executed by at least one processor of the control device 1.

Furthermore, the actuation system comprises an actuator 4 comprising a movable element.

The actuator 4 is configured to displace its movable element based on the control signal S generated by the corrective network 3 of the control device 1.

In the non-limiting embodiment shown in FIG. 1, the actuator 4 is a hydraulic actuator comprising a servo valve 5 and a ram 6; the movable element is a piston 60 of the ram 6 movable in translation in a cylinder 62 of the ram 6. The servo valve 5 is configured to inject a fluid into the cylinder 62 of the ram 6 with a certain flow rate and a certain pressure which depend on the control signal S, so as to displace the piston 60 with respect to the cylinder 62. Other types of actuators can however be used, for example an electric actuator.

Furthermore, the actuator 4 comprises a plurality of position sensors 7. Each position sensor 7 is configured to acquire a position measurement signal from the movable element 60 of the actuator. Each of the sensors 7 supplies, in other words, a position measurement independent of the other sensors 7. Each sensor is for example of the LVDT (linear variable differential transformer) type.

In the embodiment detailed hereafter, the example of a pair of sensors 7, generating a pair of independent measurement signals A, B is used. However, the invention can be generalized to a greater number of sensors 7.

Furthermore, the actuation system comprises a plurality of feedback channels 8. Each feedback channel 8 is connected to one of the position sensors 7 and on the other hand to the input of the control device 1, so as to transmit the measurement signals A, B to the control module 2.

The actuation system is configurable in two different operating modes: an open loop operating mode, and a closed loop operating mode.

Figure 2:
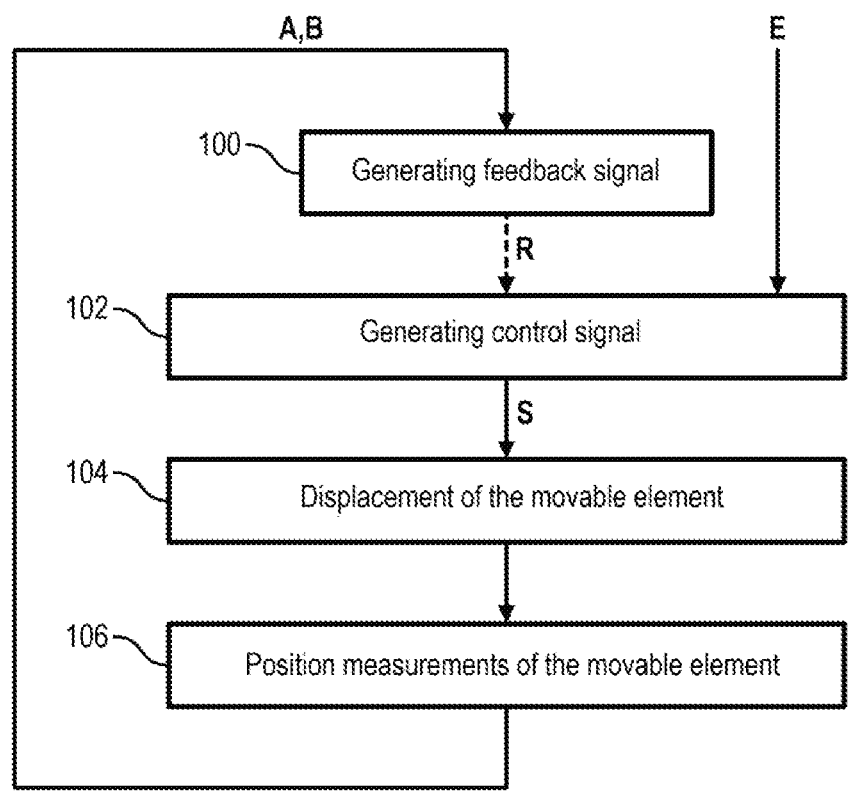
FIGS. 2 and 3 illustrate steps of a control method of an actuator, according to one embodiment of the invention.

Referring to FIG. 2, the closed loop operating mode of the actuation system is the following.

In a step 100, the feedback signal R is generated by the control module 2 based on at least one of the measurement signals A, B.

In a step 102, the corrective network 3 generates the control signal S based on a setpoint signal E received by the input of the control device 1 and based on the error signal 10 generated by the comparator 9.

The control signal S is transmitted by a suitable output of the control device 1, to the servo valve 5 of the actuator 4.

In a step 104, the servo valve displaces the movable element 60 of the actuator 4 as a function of the control signal S.

Furthermore, the different sensors 7 acquire the measurement signals A, B of the position of the movable element 60 during a step 106 consisting of position measurement of the movable element.

These measurement signals A, B are transmitted to the control module 2 of the control device 1 for the purpose of applying the step 100 consisting of generating the feedback signal R.

In the open loop operating mode, the generation 102 of the control signal S does not use the feedback signal generated by the control module 2

It can be provided that, in the open loop operating mode, the generation 100 of the feedback signal R is not implemented, this not being used in any case by the corrective network 3 in this context. Alternatively, the step 100 is still implemented in the open loop operating mode.

To diagnose a failure of a position sensor 7, the actuation system switches from one to the other operating mode by reconfiguration of the control device 1, so that the corrective network uses or does not use the feedback signal R.

Figure 3:
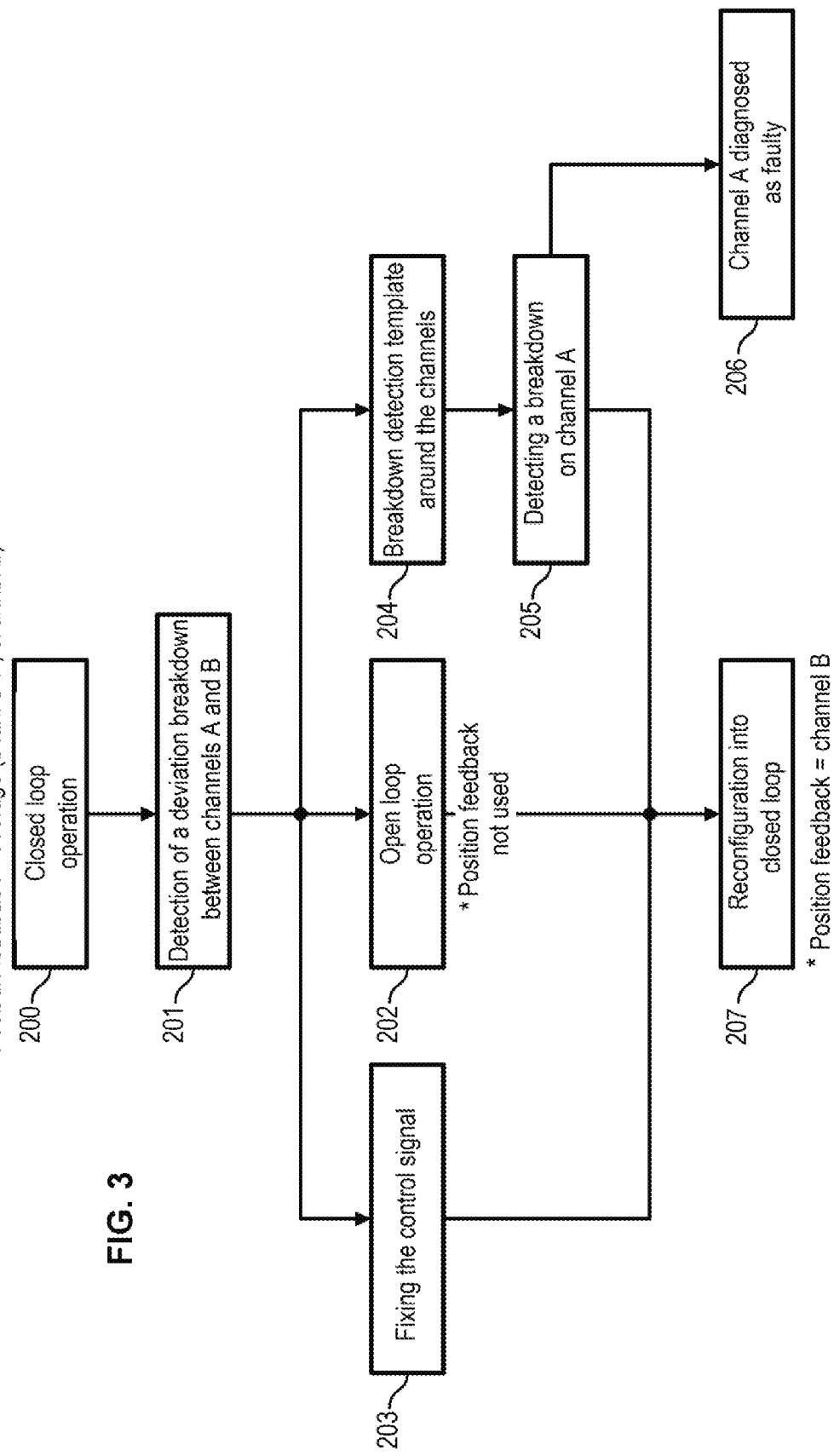

With reference to FIG. 3, the control device 1 changes operating mode by means of the following steps.

The control device 1 calculates a deviation between the measurement signals A, B received by the control module 2. The calculation of this deviation is for example implemented by the control module 2 itself. The signals being position signals, the deviation is a position deviation.

The control device 1 compares the deviation between the measurement signals with a predetermined threshold.

This threshold is determined by design practices which take into account the features of the measurement system and the feedback from experience, for example the accuracy of the system of measurement (by a multiplying factor applied to the error of the system), a breakdown threshold determined in such a manner that no operational events can occur prior to reaching this breakdown threshold.

As long as the deviation between the two measurement signals A, B is less than the predetermined threshold, the control device 1 is configured in a closed loop.

When the deviation between the two measurement signals A, B exceeds the predetermined threshold, the control device 1 is reconfigured into an open loop. In such case, the control signal S is therefore not generated using the error signal 10. The feedback signal R is therefore not taken into account for the generation of the control signal S.

More precisely, after having detected that the deviation between the signals A, B has exceeded the predetermined threshold, the corrective network is reconfigured so as to generate a control signal S having a constant value.

This constant value is for example a value taken by the control signal at the instant in which the excess over the threshold was detected by the device 1.

Figure 4A:
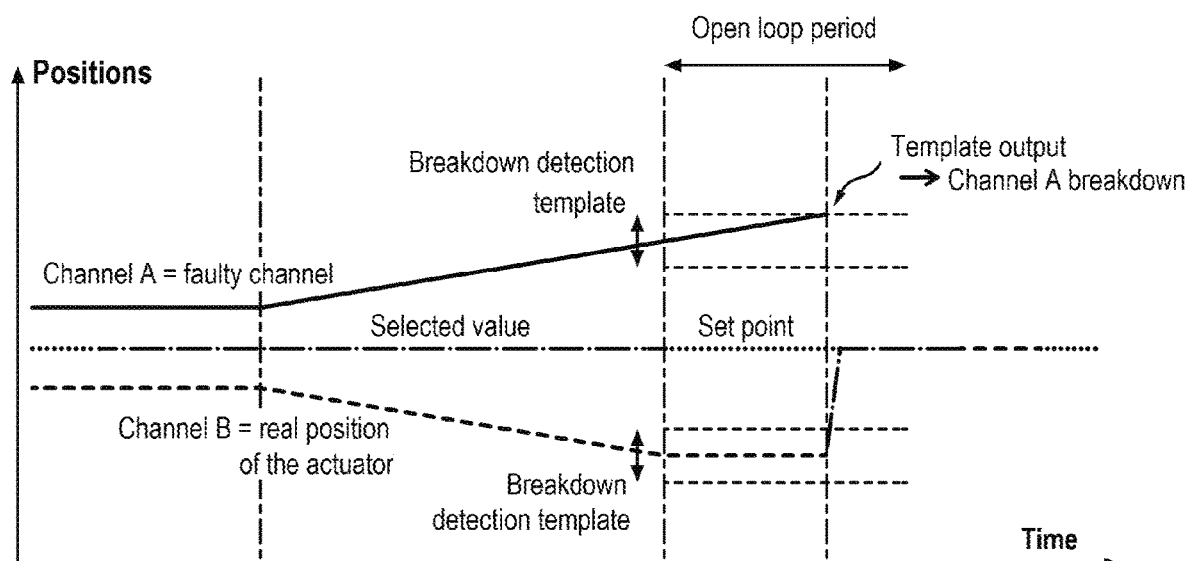
FIGS. 4a and 4b show different signals transiting in the actuation system shown in FIG. 1, during the implementation of the control method the steps of which are shown in FIGS. 2 and 3.
Figure 4B:
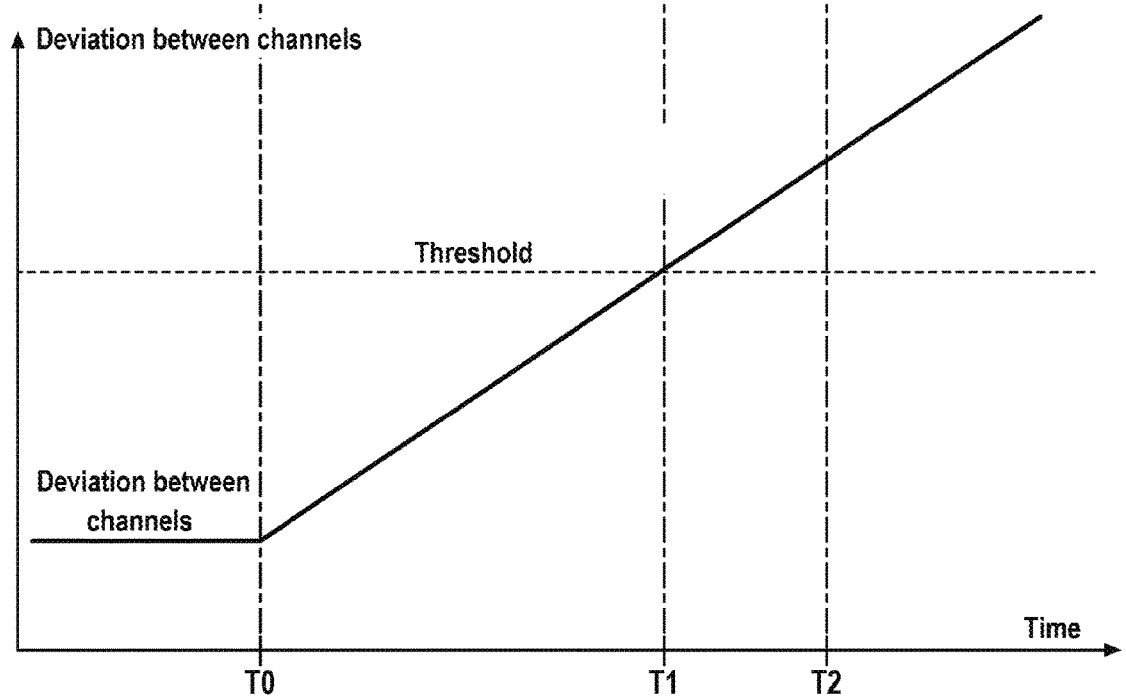

Shown in FIGS. 4a and 4b is a breakdown scenario of one of the two position sensors 7.

The sensor producing the position signal A (top of FIG. 4a) is assumed to be faulty, i.e. the signal A is noisy, and potentially subject to breakdowns likely to introduce a deviation into the signal A.

The sensor producing the position signal B (bottom of FIG. 4a) is assumed to be correct, i.e. it is measuring perfectly the position of the movable element of the actuator.

FIG. 4b shows the evolution of the deviation between the signals A and B over time. Up to an instant T0, the two sensors 7 operate without experiencing a deviation. Thus, the deviation between the signals A, B that they acquire is less than the predetermined threshold. During this first period, the control device 1 remains configured in a closed loop (step 200 in FIG. 3), i.e. the control signal is generated based on the set-point signal E and the feedback signal R. In this case, the signal R is for example:

preferably, the average of the measurement signals A and B, which is and advantageous choice in terms of accuracy, or The maximum value signal among the signals A and B, or The minimum value signal among the signals A and B.

At the instant T1, one of the sensors 7, for example the one supplying the measurement signal A, begins to deviate. The other sensor 7 supplying the signal B continues, for its part, to operate without deviation.

At an instant T2, the control module 2 detects 201 that the deviation between the measurement signals A, B has reached the predetermined threshold. The instant T2 marks the beginning of a period during which a breakdown diagnostic of the sensors 7 according to the invention is operated.

In response to the detection 201, the corrective network reconfigures 202 the control signal S into a state suitable for immobilizing the movable element 60.

For example, the corrective network fixes the control signal S to a constant value. In this case, the control module 2 transmits to the corrective network 3 a reconfiguration signal enjoining it to no longer use the feedback signal R for the generation 102 of the control signal S (hence to reconfigure into an open loop).

The control device 1 stores in memory a set-point value and configures its corrective network 3 so that the corrective network 3 uses selectively this stored value for maintaining the control signal S constant while the deviation between the measurement signals is greater than the predetermined threshold. In other words, the control signal, normally potentially variable, is in this case fixed at the stored value.

Preferably, the stored value used is the value E1 taken by the set-point signal E at the instant T2, i.e. the time that the deviation between the measurement signals has reached the predetermined threshold.

Alternatively, the stored value is the last value of the last position feedback signal, consolidated for example by the average of the two signals A and B.

Once the set point is fixed at the stored value (from the point of view of the corrective network 2), there are no longer position variations of the actuator 4. Consequently, the measurement signals A and B are supposed to be constant from then on. If a measurement signal A or B continues nonetheless to vary after the fixing of the control signal S, it means that this signal is deviating.

To diagnose a fault of this type, the control device 1 calculates, for each of the measurement signals A, B, a position interval associated with this measurement signal. Each interval includes the value taken by the corresponding measurement signal when the deviation exceeded the threshold. Consequently, at the instant T1, each measurement signal A, B takes a value included in the interval associated with it.

For example, the interval has the form [E1–X, E1+X], X being a predetermined length belonging to the sensor which supplied the measurement signal associated with the interval.

Beginning with the instant T1, the control device monitors whether an output signal remains in the interior of the interval associated with it, or not.

When the device detects that a signal takes a value outside the associated interval, then the signal in question is considered to be faulty. In fact, the departure of the value of a measurement signal outside the interval associated with it is representative of the fact that the deviation of this signal has reached a critical value. The interval defined thus constitutes a breakdown detection template.

In the example considered in FIG. 4, the signal A includes a deviation which continues to increase starting from the instant T1 and attains a critical value at the instant T2, which is the instant at which the value of the signal A departs outside the interval associated with this signal A.

On the other hand, the signal B is considered correct, i.e. it measures the real position of the movable element of the actuator 4. This signal B thus does not depart outside the interval associated with it.

In a step 205, the control device 1 detects the departure of the value of said measurement signal A outside the associated interval. This detected departure of the value of the measurement signal A is considered to be a measurement breakdown of the channel A.

In a step 206, the control device signals that signal A is a faulty signal. This signaling 206 can for example comprise the sending of an error message to another device, and/or displaying an error message on a display screen connected to the control device 1 and/or the activation of an indicator light, etc. An operator can thus conclude that the position sensor 7 emitting the faulty signal has become dysfunctional and thus replace it or repair it.

During the period [T0, T1], the control signal S is constant, so that the movable element of the actuator remains immobile.

In response to the detection 205, the control module 2 is reconfigured so as to generate a feedback signal R without using the signal A considered to be faulty. In the embodiment described until now, in which two signals A and B are considered, the feedback signal R thus depends only on the signal B after the reconfiguration 207.

In one embodiment that is particularly simple to implement, the control module 2 is reconfigured so as to operate as a measurement signal selector: the non-faulty signal B is then simply selected as the feedback signal R.

In another embodiment with more than two measurement signals, it could be considered to reconfigure the control module so that it generates the feedback signal R on the basis of each measurement signal, their average for example, with the exception of any signal detected as faulty.

Furthermore, in response to the detection of a breakdown 205, the control device 1 reconfigures 207 its corrective network 3 so that the latter again uses the feedback signal R for the generation 102 of the control signal S.

Preferably, this reconfiguration 207 of the signal R in the corrective network 3 is implemented after exclusion of the faulty signal from the generation of the signal R, so that the control S is not flawed by error.

At the conclusion of this reconfiguration, the actuation system again operates in a closed loop. Nevertheless, the flawed measurement signal A is no longer used for the implementation of this closed loop.

Furthermore, after the detection of the departure 205, the control device 1 reconfigures its corrective network 3 so that the latter again uses the set-point signal E received by the control device 1, the value of which is likely to vary, instead of the constant value E1 previously stored in memory.

Preferably, this re-use of the set-point signal E in the corrective network 3 instead of the fixed value E1 implemented after the reconfiguration of the corrective network 3 so that the latter again uses the feedback signal R.

It was previously seen that the fixing of the control signal S allows to ensure that the sensor 7 not subjected to a particular fault produces a constant measurement signal. However, a measurement signal is never perfectly stable: there always subsists a measurement noise due to the acquisition and processing of the electrical signal by the corresponding position sensor 7.

The inventors have determined experimentally that a position measurement signal varies with an amplitude on the order of the resolution of the sensor after fixing the control signal S (the noise is therefore small or zero). Thus, the length of the interval associated with a position sensor 7 is advantageously selected to be greater than the resolution of this sensor, which makes it possible to avoid false alarms. Preferably, the length of an interval is greater than 6 times the resolution of the sensor having acquired the measurement signal associated with this interval. For example, if a measurement signal acquired with a resolution of 0.1 is considered, the half-length X of the associated interval can be selected equal to 0.3: the interval with thus be [E1–0.3, E1+0.3], with a length equal to 0.6.

In addition, it is easily understood that it is not ideal to freeze the control signal of the actuator 4 for too long, because the set-point signal at the input is ignored. Thus, maintaining the control signal at a constant value is advantageously implemented over a predetermined period beginning at the instant in which the deviation between the measurement signals has exceeded the predetermined threshold.

At the conclusion of this period, the corrective network 3 is reconfigured so as to generate the control signal S based on the set-point signal E and the feedback signal R. The system is then again configured in a closed loop.

If no departure outside an interval has been detected during this stipulated period, then no breakdown has been detected. It can then be considered to generate the feedback signal R selectively on the basis of an extreme (maximum or minimum) position, for the sake of safety.

Preferably, this period during which the control S is fixed is less than 100 milliseconds, this value interval allowing the actuator to be frozen for very little time while still guaranteeing suitable detection performance for an actuator of the conventional type. Very advantageously, this duration of control S fixing is comprised between 40 and 60 milliseconds, for example 50 milliseconds.

Consider for example the position of an actuator 4 comprised in a conventional civil aviation engine in which the position has a resolution of 0.03 degrees, for a total travel of 40 degrees. Generally, such an actuator 4 is able to cover its entire travel in a period on the order of a second. The breakdown detection template after freezing of the control 203 would be more or less 0.09 degrees around the value at the moment that control was frozen. If the set point is fixed for a period of 0.5 seconds, the smallest detectable measurement deviation would be 0.18 degrees/second. It is clear that a faster deviation would be detected. If it is decided to fix only for 0.1 seconds, the limit detected deviation will be 0.9 degrees/second. A real deviation of a measurement of this type has been observed during operation. The deviation was approximately 20 degrees/second, namely considerably above the limits of detection mentioned above. Consequently, the freezing duration depends on the speed of deviation to be detected.

Thanks to the method implemented, it is thus possible to detect and to localize the deviation of a measurement channel of a position of an actuator operating in a closed loop, and also to automatically exclude the faulty measurement channel.

In addition to improving real-time management of breakdowns of the engine, the invention allows the breakdown channel to be diagnosed. This information will allow the orientation of the breakdown search on the ground, which reduces the duration of these searches.

The actuation system previously presented finds application advantageously in a turbomachine engine, for example:
  in a fuel metering device of the turbomachine,
  in a VSV (variable stator vanes) system of valves for adjusting the angle of the stators in a high-pressure compressor of a turbomachine,
  in a HPTACC (high pressure turbine active clearance control) system for controlling clearance between a high-pressure turbine and a casing of the turbomachine.

The invention claimed is:

1. A method of controlling an actuator comprising a movable element, the method comprising:
  receiving a setpoint signal, a first position measurement signal of the movable element acquired by a first position sensor and a second position measurement signal of the movable element acquired by a second position sensor different from the first position sensor;
  calculating a deviation between the first position measurement signal and the second position measurement signal; and
  generating a control signal for controlling a displacement of the movable element from the set-point signal and from at least one of the first position measurement signal and the second position measurement signal;
  when the deviation between the position measurement signals exceeds a predetermined threshold, the method further comprises:
  setting the control signal in open loop at a constant value selected independently of the first position measurement signal and the second position measurement signal so as to immobilize the movable element;
  calculating a first position interval associated with the first position measurement signal and a second position interval associated with the second position measurement signal, wherein the first position interval has a length greater than a resolution of the first position sensor or the second position interval has a length greater than a resolution of the second position sensor; and
  detecting that a first value of the first position measurement signal is outside the first position interval or that a second value of the second position measurement signal is outside the second position interval, while the control signal is fixed at the constant value.

2. The method according to claim 1, wherein, after the detecting, the control signal is generated:
  from the set-point signal and the first position measurement signal when the second value is outside the second position interval, or from the set-point signal and from the second position measurement signal when the first value is outside the first position interval.

3. The method according to claim 1, wherein the control signal is generated from the set-point signal and from at least one of the first position measurement signal and the second position measurement signal after a predetermined period starting from an instant in which the deviation exceeds the predetermined threshold.

4. The method according to claim 1, comprising reporting a fault of the first position measurement signal when the first value is outside the first position interval or a fault of the second position measurement signal when the second value is outside the second position interval.

5. The method according to claim 1, wherein the first position interval includes a value taken by the first position measurement signal when the deviation exceeds the predetermined threshold, or the second position interval includes a value taken by the second position measurement signal when the deviation exceeds the predetermined threshold.

6. The method according to claim 1, wherein the first interval has a length greater than six times the resolution of the first position sensor or the second interval has a length greater than six times the resolution of the second position sensor.

7. The method according to claim 1, wherein the control signal is generated:
  from the set-point signal and from an average of the first position measurement signal and of at least one third position measurement signal whenever the second value is outside the second position interval, or
  from the set-point signal and from an average of the second position measurement signal and of the at least one third position measurement signal whenever the first value is outside the first position interval.

8. A control device of an actuator comprising a movable element, the control device comprising:
  at least one input for receiving a set-point signal, a first position measurement signal acquired by a first position sensor and a second position measurement signal acquired by a second sensor different from the first position sensor; and
  a processor configured to calculate a deviation between the first position measurement signal and the second position measurement signal, and to generate a control signal for controlling a displacement of the movable element from the set-point signal and from at least one of the first position measurement signal and the second position measurement signal,
  wherein when the deviation exceeds a predetermined threshold, the processor is further configured to at least:
  set the control signal in open loop at a constant value selected independently of the first position measurement signal and the second position measurement signal so as to immobilize the movable element;
  calculate a first position interval associated with the first position measurement signal and a second position interval associated with the second position measurement signal, wherein the first position interval has a length greater than a resolution of the first position sensor or the second position interval has a length greater than a resolution of the second position sensor; and detect that a first value of the first position measurement signal is outside the first position interval or that a second value of the second position measurement signal is outside the second position interval, while the control signal is fixed at the constant value.

9. The control device according to claim 8, further comprising:

a plurality of position sensors configured to acquire the first position measurement and the second position measurement signal of the movable element; and at least one feedback channel to transmit to the at least one input of the control device the first position measurement and the second position measurement signal acquired by the plurality of position sensors.

\* \* \* \* \*